Figures 3, 4:
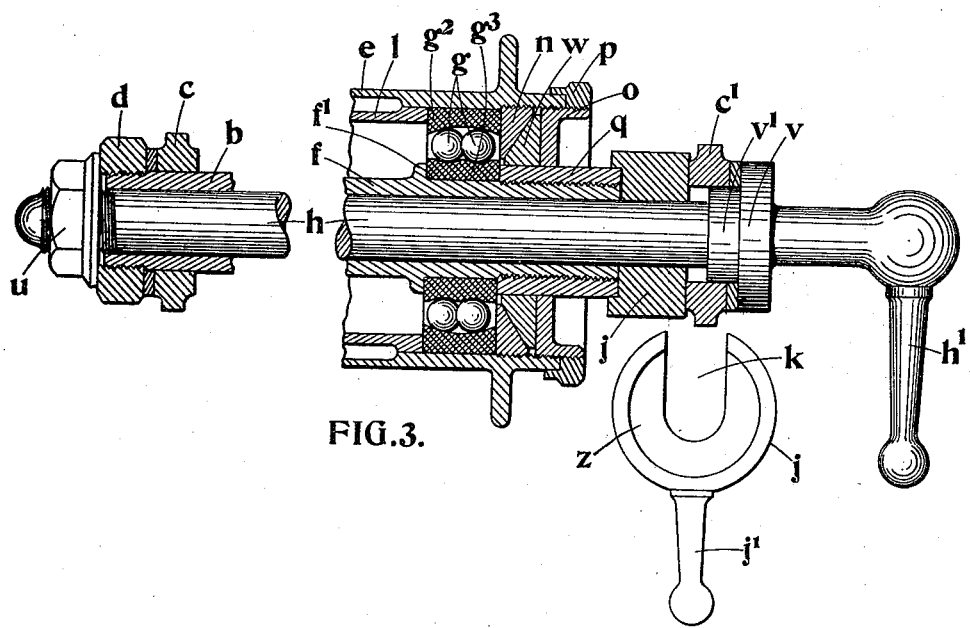

H. A. & C. R. COLLIER.
WHEEL OF MOTOR CYCLES AND THE LIKE.
APPLICATION FILED APR. 4, 1914.
1,132,831.
Patented Mar. 23, 1915.
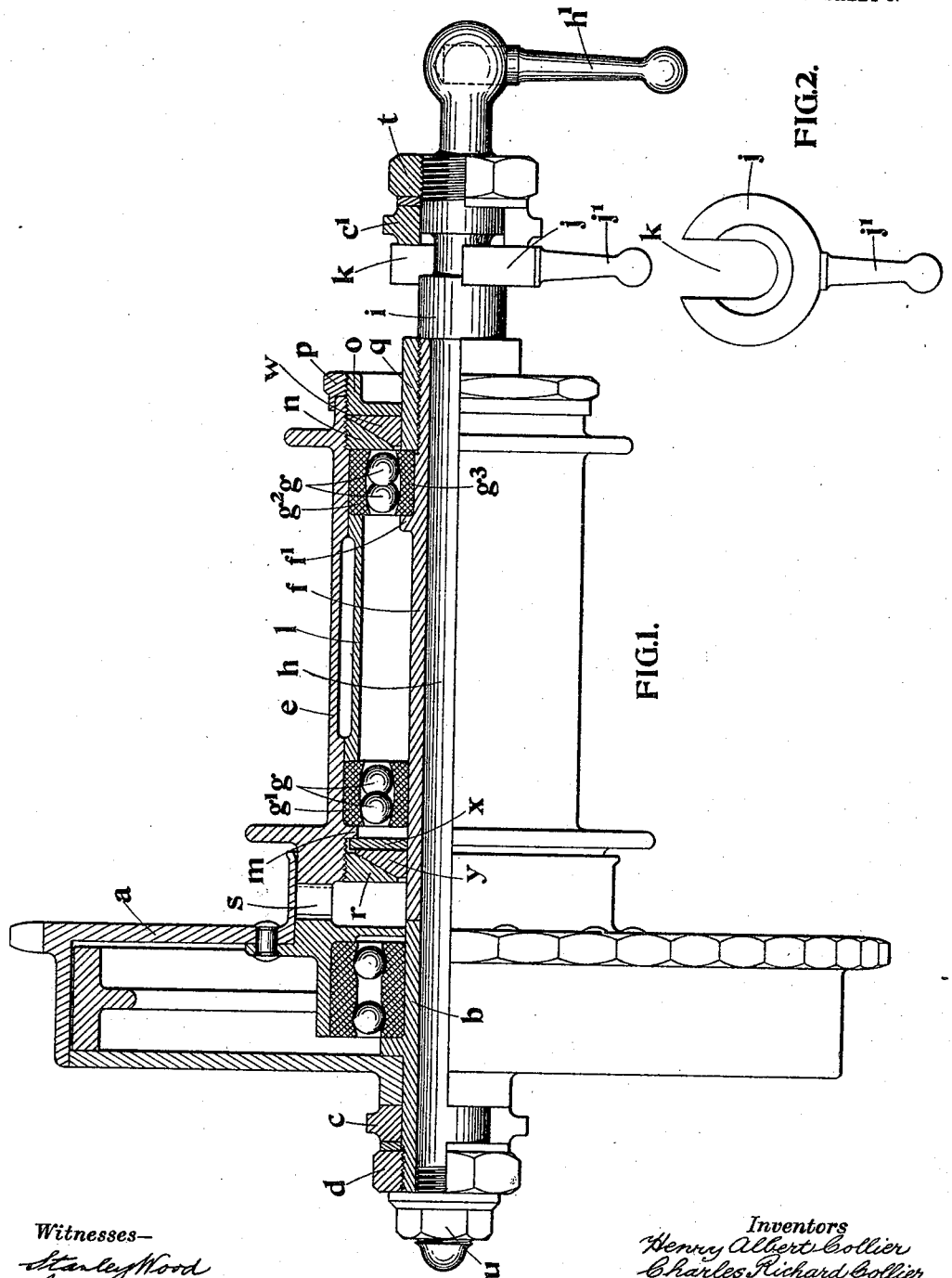
Witnesses—
Inventors
Henry Albert Collier
Charles Richard Collier
by
Attorney.

H. A. & C. R. COLLIER.
WHEEL OF MOTOR CYCLES AND THE LIKE.
APPLICATION FILED APR. 4, 1914.

1,132,831.

Patented Mar. 23, 1915.

2 SHEETS—SHEET 2.

Witnesses—

Inventors
Henry Albert Collier
Charles Richard Collier
by
Attorney.

UNITED STATES PATENT OFFICE.

HENRY ALBERT COLLIER AND CHARLES RICHARD COLLIER, OF PLUMSTEAD, LONDON, ENGLAND.

WHEEL OF MOTOR-CYCLES AND THE LIKE.

1,132,831.  Specification of Letters Patent.  Patented Mar. 23, 1915.

Application filed April 4, 1914. Serial No. 829,664.

*To all whom it may concern:*

Be it known that we, HENRY ALBERT COLLIER and CHARLES RICHARD COLLIER, subjects of the King of Great Britain and Ireland, residing at 44 Plumstead road, Plumstead, London, S. E., England, have invented certain new and useful Improvements Relating to the Wheels of Motor-Cycles and the like, of which the following is a specification.

This invention relates to the wheels of motor cycles and the like, and has for its object to provide simple and effective means to permit of the ready detachment of the rear wheel.

The object of the invention is to provide an effective construction of a readily detachable wheel wherein the wheel hub can be laterally moved from engagement with the sprocket wheel before the axle is withdrawn. Such a construction permits of the hub being first mounted on the axle, and thus the respective faces of the clutch are concentrically disposed, by which the hub may be then conveniently positioned with its clutch face in engagement with that of the driving sprocket.

According to the invention, we mount the hub of the wheel in such manner that a slight lateral movement is permitted to it, by which its clutch face may disengage from the clutch face of the driving sprocket wheel. For this purpose a fitting is employed which acts as a distance piece and which, when the axle or bolt is tightened up, is fixedly secured in its position, by which lateral movement of the hub is precluded, while upon the nuts being slackened by which the axle or bolt is secured and the consequent release of the forked ends of the frame the fitting referred to may be readily withdrawn, and thus the lateral movement of the hub is permitted. Similarly, it will be understood that when replacing the wheel in position it is possible to thread the axle through the sleeve of the hub and through the sleeve of the driving sprocket, which is retained in one of the forked ends of the frame.

The invention is illustrated, by way of example, in the accompanying drawings, in which—

Figure 1 is an elevation of the wheel hub, the upper half being in section, Fig. 2 is a side view of the fitting $j$ illustrated in Fig. 1, Fig. 3 is a part sectional elevation of a modification in construction, Fig. 4 is a side view of the fitting $j$ illustrated in Fig. 3.

In carrying the invention into effect as illustrated in Fig. 1, we rotatably mount the driving sprocket and brake drum $a$ upon a sleeve $b$, which is secured at one end within the forked end $c$ of the frame by means of a nut $d$, so that thus the driving sprocket may not necessarily be withdrawn when it is desired to remove the wheel.

The hub $e$ is mounted upon an independent central sleeve $f$, ball-bearings $g$ being also interposed between the hub $e$ and the sleeve $f$. The fixed sleeve $b$ of the driving sprocket and the independent central sleeve $f$ of the wheel hub have preferably the same internal diameter for the reception of a common axle or bolt $h$. Upon the end of the bolt $h$ opposite to that which is inserted through the hub sleeve $f$ and the driving sprocket sleeve $b$, a suitable boss or enlargement $i$ is provided, while beyond this boss or enlargement $i$ the bolt $h$ is recessed or has a diameter corresponding to that of the main part of its length. The extremity of this end of the bolt $h$ may be provided of the same diameter as the boss or enlargement, and may fit within the forked end of the frame. Within the recessed part of the bolt $h$, between the bosses or enlargements, a fitting $j$ is adapted to be inserted which is of circular shape as shown in Fig. 2, and is provided with a radial and open slot $k$ of a width corresponding to that of the recessed part of the bolt $h$ so that thus this fitting may be brought into a concentric position with the bolt $h$, the recessed part of the bolt lying in the bottom of the open slot $k$. This fitting $j$ is provided with a circular recess on one of its faces corresponding in diameter to the boss or enlargement $i$ between the main part of the bolt or axle $h$ and the recessed part aforesaid.

The plane face of the fitting $j$ bears against the forked end $c^1$ of the frame and when the nut $t$ is screwed upon the bolt or axle $h$, the fitting forms an abutment so that the bolt or axle $h$ may be secured to the frame.

The hub $e$ is provided with an internal sleeve $l$ which is located between the outer ball race rings $g^1$ $g^2$ of the two ball bearings $g$, on race ring $g^1$ being kept in position longitudinally by means of an internal flange $m$ provided within the hub $e$. In the assembled position the ball race ring $g^1$, the sleeve $l$, and the ball race ring $g^2$ are clamped in position by means of a nut $n$ the outer face of which is internally coned. A lock nut $o$ is screwed into the hub and between it and the nut $n$ is placed a felt washer $w$, the lock nut $o$ being also locked within the hub by a ring nut $p$. The inner ball race rings of the ball bearings $g$ are fixedly secured to the independent central sleeve $f$, the race ring $g^3$ being clamped thereon by means of a flange $f^1$ on the sleeve and a nut $q$ which is screwed upon the end of the sleeve. At the other end of the hub is provided a flat washer $x$ which bears against the internal flange $m$ and upon the outside face of this washer is placed a felt washer $y$ which is held in position by an internally coned washer $r$ screwed within the hub.

Upon the end of the hub adjacent the driving sprocket $a$ dog or clutch teeth $s$ are provided which are adapted to engage with similar dog or clutch teeth provided upon the driving sprocket.

In fitting the parts in position, the driving sprocket is mounted upon its sleeve $b$, and the sleeve is secured within the forked end of the frame by means of a nut $d$ and a washer. The axle or bolt $h$ is introduced through the sleeve $f$ of the hub, and then passes into the sleeve $b$ of the driving sprocket. For this to be done the opposite end of the bolt $h$ has to pass laterally into the forked end $c^1$ of the frame. The hub may then be moved forward so that its clutch face $s$ will engage with the clutch face of the driving sprocket, and thus the axle or bolt $h$ may be moved laterally forward to a corresponding extent. In this position the bolt or axle $h$ is secured by means of a nut $u$ mounted upon its front extremity. In this lateral movement, the recessed part of the axle or bolt $h$ provided immediately beyond the boss or enlargement $i$ thereon comes to lie completely on the inside of the adjacent forked end $c^1$ of the frame. By these means the fitting $j$ can be introduced in position. The width between the forked ends of the frame is normally slightly greater than is necessary to accommodate the hub and upon the nut $t$ being fitted on to the projecting end of the axle or bolt $h$, the forked end $c^1$ of the frame is pressed inward, and thus the boss or enlargement $i$ provided on the axle or bolt enters in the recessed face of the fitting $j$ and the fitting is thus tightly retained between the face of the boss or enlargement $i$ and the inner face of the forked end $c^1$ of the frame, whereby the whole of the parts are retained in such position that the lateral movement of the hub upon the axle or bolt $h$ is precluded. It will be understood that on the release of the nut $t$ the forked end $c^1$ of the frame will spring outward and thus permit of the release of the fitting $j$.

The invention is not limited to any particular form of the fitting which is provided for use in the manner hereinbefore described, as a fitting of any other form may be provided without departing from the invention.

It is to be observed that the boss or enlargement upon the bolt or axle may be dispensed with and the circular recess in the face of the fitting may be formed to engage upon the adjacent end of the hub sleeve. Such an arrangement is shown in Figs. 3 and 4, wherein the fitting $j$ is provided with a recess $z$ of sufficient diameter to accommodate the nut $q$ on the independent central sleeve $f$. The axle or bolt $h$ in this construction is formed with a boss $v$ which engages the outer face of the forked end $c^1$ of the frame and which takes the place of the clamping nut $t$ (Fig. 1). By such an arrangement only one nut $u$ is necessary to secure the bolt or axle $h$ in position. The bolt or axle is thus of uniform diameter throughout but may be provided with a boss $v^1$ or bush on the inner face of the boss $v$ of a diameter corresponding to the slot in the forked frame end $c^1$ to form a bearing for the bolt or axle $h$ therein. The axle or bolt $h$ is provided with a lever or handle $h^1$ so that it can be held against rotation during the tightening and slackening of the nuts.

What we claim as our invention and desire to secure by Letters Patent is:—

1. A detachable wheel construction for motor cycles, consisting of a driving wheel, a tubular sleeve upon which said driving wheel is mounted to rotate, a forked cycle frame upon one member of which the said sleeve is fixedly mounted, said cycle frame having its opposite member provided with an open-ended slot, a wheel hub separate from the said driving wheel, a tubular sleeve upon which said wheel hub is mounted, a driving connection between the said driving wheel and the said wheel hub adapted to be disconnected on the endwise movement of the said hub, an axle adapted to be passed through the said open-ended slot in one member of the cycle frame and through the tubular hub sleeve and the tubular driving wheel sleeve, means upon the said axle for bringing the frame members together, and a distance piece adapted to prevent the endwise movement of the hub on the frame members being brought together and to be released on the separation of the said members, substantially as described.

2. A detachable wheel construction for motor cycles, consisting of a driving wheel, a tubular sleeve upon which said driving wheel is mounted to rotate, a forked cycle frame upon one member of which the said sleeve is fixedly mounted, said cycle frame having its opposite member provided with an open-ended slot, a wheel hub separate from the said driving wheel, a tubular sleeve upon which said wheel hub is mounted, a driving connection between the said driving wheel and the said wheel hub adapted to be disconnected on the endwise movement of the said hub, an axle adapted to be passed through the said open-ended slot in one member of the cycle frame and through the tubular hub sleeve and the tubular driving wheel sleeve, means upon the said axle for bringing the frame members together, and a distance piece having an open-ended radial slot and a recessed face forming a flange, the said flange permitting of the distance piece being held on the axle upon the said frame members being brought together, substantially as described.

3. A detachable wheel construction for motor cycles, consisting of a driving wheel, a tubular sleeve upon which said driving wheel is mounted to rotate, a forked cycle frame upon one member of which the said sleeve is fixedly mounted, said cycle frame having its opposite member provided with an open-ended slot, a wheel hub separate from the said driving wheel, a tubular sleeve upon which said wheel hub is mounted, a driving connection between the said driving wheel and the said wheel hub adapted to be disconnected on the endwise movement of the said hub, an axle adapted to be passed through the said open-ended slot in one member of the cycle frame and through the tubular hub sleeve and the tubular driving wheel sleeve, means upon the said axle for bringing the frame members together, a boss upon the said axle, a distance piece adapted to engage with the said boss, said distance piece having a recess on one face for the reception of one end of the boss, and an open-ended radial slot, substantially as described.

In testimony whereof we have hereunto signed our names to this specification in the presence of two subscribing witnesses.

HENRY ALBERT COLLIER.
CHARLES RICHARD COLLIER.

Witnesses:
R. O. HUGHES,
W. E. ROGERS.

Copies of this patent may be obtained for five cents each, by addressing the "Commissioner of Patents, Washington, D. C."